United States Patent [19]

Falciglia

[11] Patent Number: 4,912,285

[45] Date of Patent: Mar. 27, 1990

[54] ANTI-SHORT BUSHING

[75] Inventor: James W. Falciglia, East Greenwich, R.I.

[73] Assignee: Nortek, Inc., Providence, R.I.

[21] Appl. No.: 192,209

[22] Filed: May 10, 1988

[51] Int. Cl.[4] .......................................... H01B 17/58
[52] U.S. Cl. ........................................ 174/83; 16/2
[58] Field of Search ................ 174/83, 152 G, 153 G; 16/2; 248/27.3, 56; 285/162, 319; 411/74; 439/553, 555, 557, 558, 567

[56] References Cited

U.S. PATENT DOCUMENTS

| | | | |
|---|---|---|---|
| 1,742,488 | 1/1930 | Schneider et al. | 174/83 |
| 1,779,951 | 10/1930 | Schneider | 174/83 |
| 1,793,697 | 2/1931 | Johnson | 174/83 |
| 1,799,765 | 4/1931 | Schneider et al. | 174/83 |
| 1,801,549 | 4/1931 | Frederickson | 174/83 |
| 1,808,542 | 6/1931 | Ginsburg | 174/83 |
| 1,829,512 | 10/1931 | Frederickson | 174/83 |
| 1,842,216 | 1/1932 | Thomas, Jr. | 174/83 X |
| 2,209,274 | 7/1940 | Jaberg | 174/83 |
| 2,246,124 | 6/1941 | Carlson | 174/83 X |
| 2,249,593 | 7/1941 | Badeau | 174/83 |
| 2,268,060 | 12/1941 | Rhode | 174/83 |
| 2,424,756 | 7/1947 | Klumpp, Jr. | 174/153 G |
| 2,563,604 | 8/1951 | Hultgren | 174/153 G |
| 3,056,852 | 10/1962 | Sachs | 174/153 G |
| 3,643,290 | 2/1972 | Milne | 16/2 |
| 3,836,698 | 9/1974 | Bawa | 174/83 |
| 3,858,151 | 12/1974 | Paskert | 285/162 X |
| 3,889,909 | 6/1975 | Koscik | 248/56 |
| 4,233,469 | 11/1980 | Steppe | 174/83 |
| 4,289,923 | 9/1981 | Ebert | 174/65 G |
| 4,448,376 | 5/1984 | Behrendt | 248/56 X |
| 4,535,196 | 8/1985 | Milne | 174/83 |
| 4,575,133 | 3/1986 | Nattel | 285/319 |
| 4,626,620 | 12/1986 | Plyler | 285/162 X |
| 4,683,350 | 7/1987 | Ducret | 174/83 |
| 4,711,472 | 12/1987 | Schnell | 285/319 X |
| 4,752,652 | 6/1988 | Danti et al. | 174/83 |

Primary Examiner—Laramie E. Askin

[57] ABSTRACT

An anti-short bushing to be inserted between a metal sheath and an enclosed wire of a flexible armored cable of the kind whose sheath has a groove on its interior surface, has a generally tubular body, and a retainer attached to and movable relative to the body and configured so that, when the bushing is inserted, the wire bears against the retainer, and either the retainer is forced against the inner wall of the metal sheath, or the wire causes the retainer to seat in the groove. In another aspect, the invention features an anti-short bushing having a generally tubular body with a flange at one end and a ridge between the flange and the tubular body, configured so as to engage a cut edge of the cut end of the sheath.

21 Claims, 4 Drawing Sheets

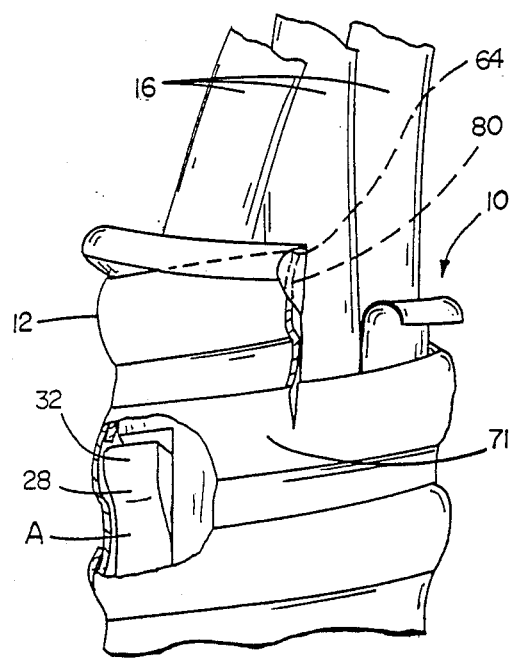 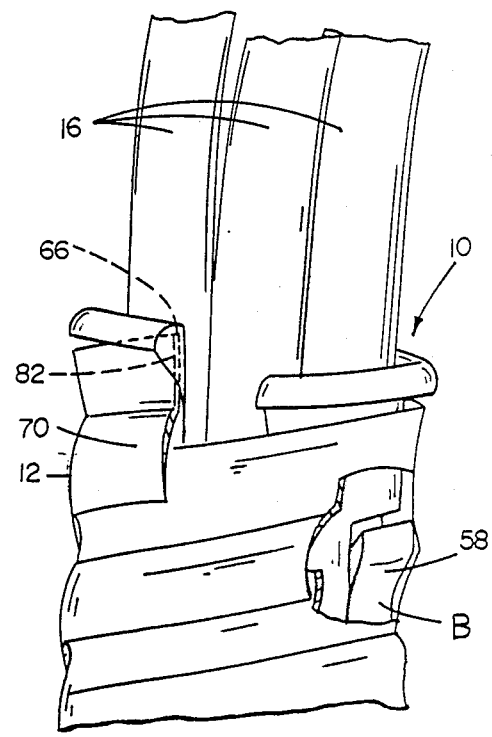
FIG. 8a
FIG. 8b
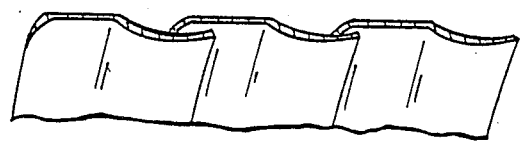
FIG. 8c

ANTI-SHORT BUSHING

BACKGROUND OF THE INVENTION

This invention relates to anti-short bushings to be used with flexible armored cable.

When the helical steel sheath of the armored cable has been cut to expose the insulated wires carried in the sheath, an anti-short bushing is typically inserted between the sheath and the wires to protect the wires from abrasion. Various methods have been used to help keep the bushing in place within the cable sheath, including friction between the outer bushing surface and the interior of the sheath, and tabs, tongues, or lugs that seat in the interior groove of the cable sheath.

SUMMARY OF THE INVENTION

In general, the invention features an anti-short bushing having a generally tubular body, and a retainer attached to and movable relative to the body and configured so that, when the bushing is inserted, the wire bears against the retainer and either the retainer is forced against the inner wall of the metal sheath or the wire causes the retainer to seat in the groove.

In another aspect, the invention features an anti-short bushing having a generally tubular body with a flange at one end and a ridge between the flange and the tubular body, configured so as to engage a cut edge of the cut end of the sheath.

Preferred embodiments include the following features. The tubular body includes a flange at one end and encloses a space to be occupied by the wire. Two retainers in the side of the bushing body each includes a portion that is arranged to protrude into the inner space when the bushing is inserted as well as when it is not being inserted. The body has a wall of nominal thickness, and each retainer includes a portion thicker than the wall. Each retainer includes a tongue having a free end for seating in the groove and a fixed end attached to the body. Each tongue is elongated, and the fixed end of the tongue is nearer the leading end of the bushing body than is the free end. Each tongue also includes a tapered surface that faces the leading end of the bushing body and tapers toward the center of the inner space, so that as the wire enters the leading end and strikes the tapered surface, the wire is guided into the bushing and simultaneously bears against the tongues causing them to move outward and press against the sheath interior. The free ends of the tongues, which can seat in the groove of the cable, are angled to conform to the angle of the helical groove.

The bushing is easy to insert, stays in place but is also removable, protects the insulated wires, and is simple and inexpensive to fabricate. It accommodates either end of non-symmetric armored cable.

Other features and advantages of the invention will be apparent from the following description of the preferred embodiment, and from the claims.

DESCRIPTION OF THE PREFERRED EMBODIMENT

We first briefly describe the drawings.

FIGS. 8A and 8B are side views, like FIG. 1, of opposite ends of the cable with the anti-short bushing fully inserted and retainers A and B, respectively, seated in the groove.

FIG. 8C is a cross-sectional view of the wall of the metal sheath.

STRUCTURE

Figure 1:
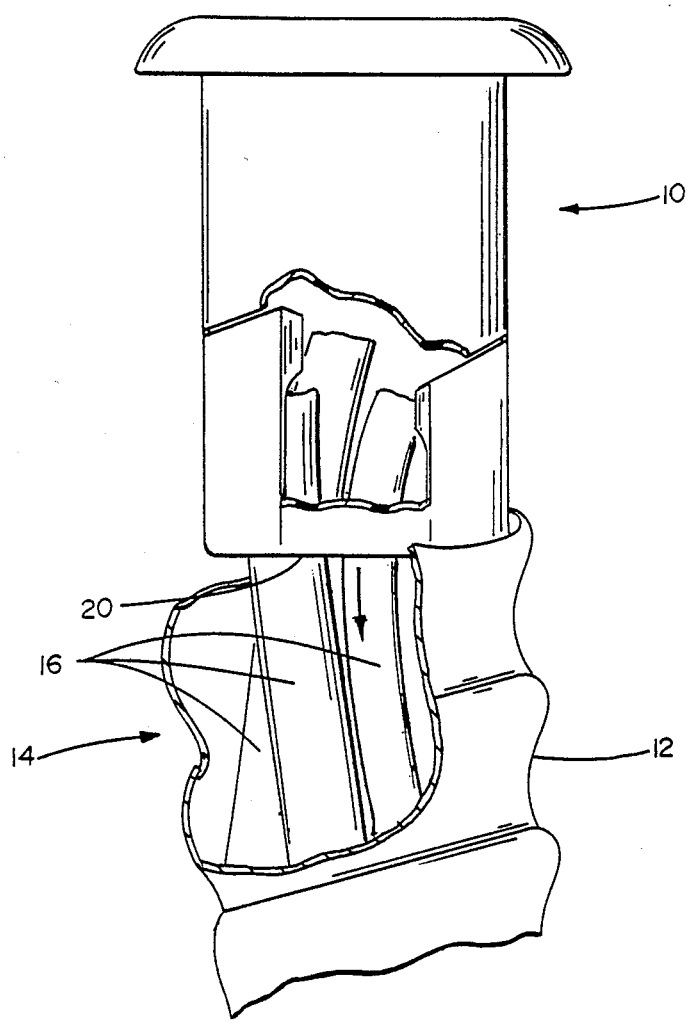
FIG. 1 is a side view of a flexible armored cable, partially cut-away, and an anti-short bushing (partially cut-away) being inserted into the cable.

Referring to FIG. 1, a molded, plastic anti-short bushing 10 (molded of petrothene, U.S.I. Chemicals Co.) is configured to be inserted into the space between the helical steel sheath 12 of flexible armored cable 14 and the insulated copper wires 16 carried within the sheath.

Figure 7:
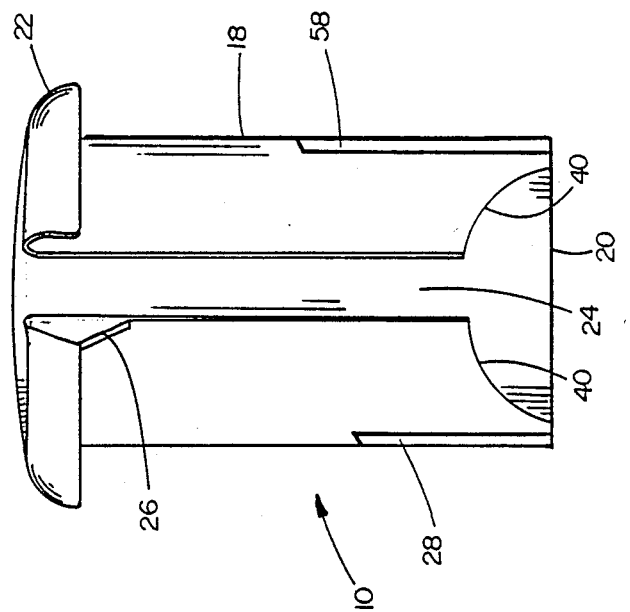
Figure 6:
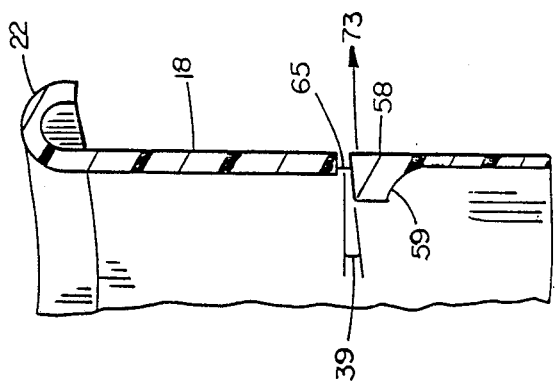

Referring to FIGS. 2–7, bushing 10 has a 0.384" outside diameter (not including a flange 22) by 0.712" long tubular body 18 (0.020" wall thickness) with a leading edge 20 at one end (to be inserted first between the wires 16 and the sheath 12), a 0.86" wide flange 22 at the other end (to cover the cut end of the sheath), and a lengthwise opening 24 (0.20" wide) in one side of the tubular body (FIG. 7), to allow the bushing to expand or contract and to allow the two sides of the tubular body to shift longitudinally relative to each other as the bushing is inserted. On the left side of the opening, under the flange, is a ridge 26 (FIG. 7).

Figure 5:
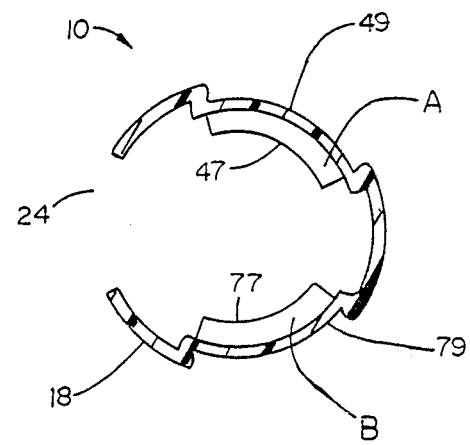

Attached to the bushing body, one-third of the way around the bushing from opening 24 in a clockwise direction in the view of FIG. 5, and beginning 0.390" from the flange end, is a retainer, A, (FIGS. 2, 3, and 5) including a tongue 28 (0.212" long, 0.18" wide) with a fixed end 30 and a free end 32 (0.05" thick) for seating in the interior groove of the helical sheath. Bushing body 18 has a clearance slot 35 that corresponds to and provides a clearance of 0.015" on three sides of tongue 28.

Attached to the side of the bushing body one third of the way around the bushing from opening 24 (in a counter-clockwise direction in the view of FIG. 5), and beginning 0.340" from the flange end, is a second retainer, B, (FIGS. 2, 4, and 5) including a tongue 58 (0.242" long, 0.18" wide) with a fixed end 60 and a free end 62 (0.05" thick) also for seating in the interior groove of the helical sheath. Bushing body 18 has a clearance slot 65 that corresponds to and provides a clearance of 0.015" on three sides of tongue 58.

Figure 2:
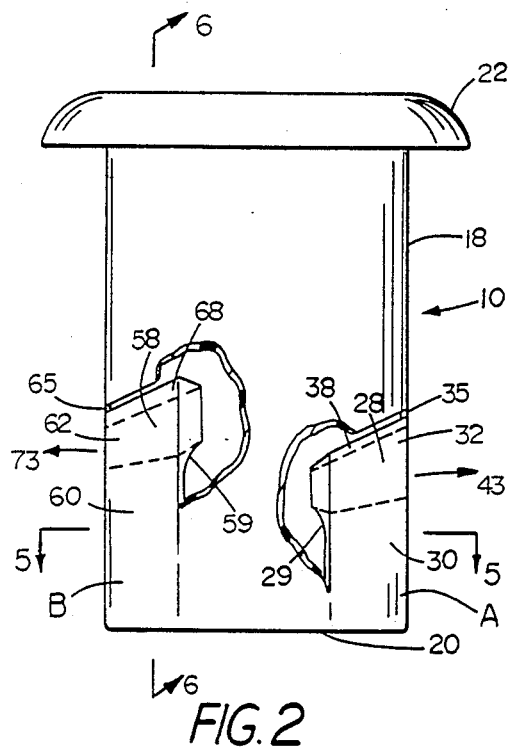
FIGS. 2–7 are, respectively, a rear view (partially cut-away), left side view, right side view, cross-sectional view (at 5—5 of FIG. 2), cross-sectional view (at 6—6 of FIG. 2), and front view of an anti-short bushing.

Tongues 28 and 58 have surfaces 29 and 59 tapered such that when the bushing is inserted, the wires entering leading end 20 strike the tapered surfaces 29 and 59, are guided into the bushing, and press against the tongues. The tongues also have surfaces 38 and 68 on their free ends 32 and 62 that in one dimension (FIGS. 3 and 4) are slanted at a 15° angle 34, to match the slant of the interior groove of the sheath, and in another dimension (FIG. 6, tongue 58) slant inward at a 5° angle 39 to allow the tongues to clear the holes 35 and 65 as they move outward in the direction of arrows 43 and 73 (FIG. 2). The inner and outer tongue surfaces 47 and 77, 49 and 79 are curved (FIG. 5), and each tongue is thicker (0.05" thick) at its free end than the wall thickness of the bushing body.

Figure 3:
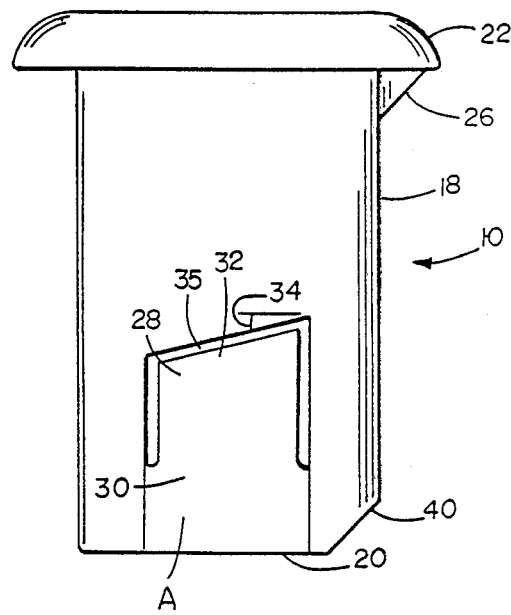
Figure 4:
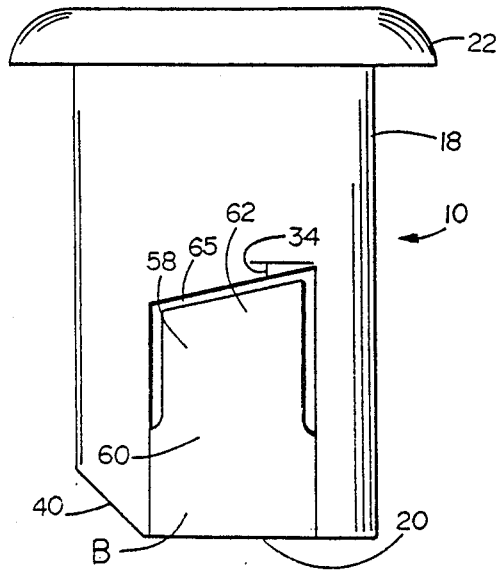

As originally molded, the outer surfaces 49 and 79 of the tongues conform to the outer surface of the bushing body and their inner surfaces 47 and 77 project into the space enclosed by the bushing body. The leading end of the bushing body is cut along a line 40 at an angle of 30° to aid insertion (FIGS. 3, 4, 7).

OPERATION

Referring to FIGS. 8A, 8B, the internal wall of the metal sheath of a flexible armored cable presents two different contours to an inserted anti-short bushing depending on which end of the cable receives the bushing. This difference is caused by the asymmetry of the metal strip that, joined back on itself in a helical configuration, makes the cable (FIG. 8C). As a result, referring to FIGS. 8A and 8B, when the sheathing is cut (e.g., along line 80 on one end, or along line 82 on the other end), the distances along the cable, from outermost point 64, 66 of the cut to the first groove 71, 70 where one of the tongues may seat, differ. To accommodate this fact, the two tongues are designed so that no matter which end of the cable receives the bushing, one of the tongues will seat in the groove.

In the fully inserted position of the bushing, ridge 26 rests against the outermost point 64, 66 of the cut edge 80, 82. The bushing body distorts along the lengthwise opening 24 to conform generally to the slant of the interior groove of the sheath. However, the bushing does not distort as much as the groove slants (FIGS. 8A, 8B). The tongues have been designed so that, given the placement of a particular tongue in the bushign body, the distance from the flange of the bushing to the top of the tongue is the same as the distance from the flange (in the inserted position of the bushing) to the point of the groove where that tongue is to seat.

Tongue A seats in the groove for the end of the cable shown in FIG. 8A; tongue B for the end shown in FIG. 8B. FIG. 8C shows a cross-sectional view of the interior of the cable sheath. The left side of FIG. 8C depicts the cable end into which the bushing is inserted in FIG. 8A while the right side depicts the cable end into which the bushing is inserted in FIG. 8B.

At either end of the cut cable, the wires are guided into the inserted bushing by tapered surfaces 29 and 59 and begin to force the tongues through the clearance slots in the bushing body. Referring to Fig. 8A, as the bushing continues to be pushed into the sheath, one of the tongues, in this case tongue 28, eventually seats in the helical groove with its free end 32 pressing against the wall of the groove and also back against the wires as it responds to the restraining force of the sheath. The other tongue 58 (not shown), presses against both the wall of the cable and back against the wires but does not seat in the groove. If the bushing is inserted into the cable from the other direction (FIG. 8B), the tongues operate in the reciprocal manner; tongue 58 seats in the helical groove; tongue 28 does not. In either diretion that the bushing is inserted (FIGS. 8A, 8B), after a tongue is first seated in the groove, it may be necessary to turn the bushing clockwise relative to the sheath to guide the tongue along the helical groove and draw the bushing into the sheath so that ridge 26 prevents the cut edge 64, 66 of the cable sheath from penetrating into the bushing opening 24 and perhaps cutting the wires. Once the bushing is in place, the wires continue to bear on the inner surfaces of the tongues, forcing one tongue into the groove and the other against the cable wall. The bushing may be removed by rotating it counterclockwise.

Other embodiments are within the following claims.

I claim:

1. A molded anti-short bushing to be inserted between a metal sheath and an enclosed wire of a flexible armored cable of the kind whose sheath has a groove on its interior surface, said bushing comprising
    a generally tubular insulating body having a flange at one end and enclosing an inner space to be occupied by said wire,
    a retainer attached to and movable relative to said body, said retainer including a portion that protrudes into said inner space in the original configuration of said bushing, and
    a ridge connected between said flange and said tubular body and configured so as to engage a cut edge of the cut end of the sheath.

2. The bushing of claim 1, wherein said retainer comprises a tongue having a movable free end and a fixed end attached to said body.

3. The bushing of claim 2 wherein said tongue is elongated, said body has a leading end which is to be inserted first inside said sheath, and said fixed end of said tongue is nearer said leading end than is said free end.

4. The bushing of claim 2 comprising two said tongues.

5. An anti-short bushing to be inserted between a metal sheath and an enclosed wire of a flexible armored cable of the kind whose sheath has a groove on its interior surface, said bushing comprising
    a generally tubular insulating body including a wall having a thickness and enclosing an inner space to be occupied by said wire,
    a retainer attached to and movable relative to said body, said retainer including a portion thicker than said wall thickness and a free end angled to conform to the angle of said groove.

6. The bushing of claim 5 wherein said retainer comprises a tongue having a movable free end and a fixed end attached to said body.

7. The bushing of claim 6 wherein said tongue is elongated, said body has a leading end which is to be inserted first into said sheath, and said fixed end of said tongue is nearer said leading end than is said free end.

8. The bushing of claim 7 wherein said retainer comprises two said tongues.

9. The bushing of claim 3 or 7 wherein said tongue includes a tapered surface that tapers toward the center of said inner space with greater distance from said leading end, so that as said wire enters said leading end and strikes said tapered surface, said wire is guided into said bushing and simultaneously bears against said tongue, forcing it partially outside said body.

10. An anti-short bushing to be inserted between a metal sheath and an enclosed wire of a flexible armored cable of the kind whose sheath has a groove on its interior surface, said bushing comprising
    a generally tubular insulating body and a flange at one end of said body,
    two retainers each comprising a tongue having a movable free end and a fixed end attached to said body, and
    a ridge connected between said flange and said tubular body and configured to engage a cut edge of the cut end of the sheath.

11. The bushing of claim 10 wherein the free ends of said two tongues of said two retainers respectively are positioned at two different distances from an end of said body.

12. An anti-short bushing to be inserted between a metal sheath and an enclosed wire of a flexible armored cable of the kind whose sheath has a groove on its interior surface, said bushing comprising a generally tubular insulating body including a wall having a thickness, and two retainers, each including a portion thicker than said wall thickness, said retainers each comprising a tongue having a movable free end and a fixed end attached to said body, said movable free ends of said two tongues being positioned at two different distances from an end of said body.

13. The bushing of claim 10 or 12 wherein each said tongue is elongated, said body has a leading end which is to be inserted first inside said sheath, and said fixed end of each said tongue is nearer said leading end than is said free end.

14. The bushing of claim 10 or 12 wherein said insulating body encloses an inner space and has a leading end to be inserted first inside said sheath, and each said tongue includes a tapered surface that increases toward the center of said inner space with greater distance from said leading end, so that as said wire enters said leading end and strikes said tapered surface, said wire bears against said tongue, forcing it partially outside said body.

15. An anti-short bushing to be inserted between a metal sheath and an enclosed wire of a flexible armored cable of the kind whose sheath has a groove on its interior surface, said bushing comprising a generally tubular insulating body with a flange at one end, wherein said tubular body includes a wall having a nominal thickness, encloses an inner space to be occupied by said wire, and has a leading end which is to be inserted first inside said sheath;

a lengthwise opening in one side of said tubular body and said flange;

a ridge between said flange and said tubular body on one side of said lengthwise opening; and two elongated tongues attached to and movable relative to said body each with a free end that is angled to conform to the angle of said groove and each with a fixed end nearer said body leading end than is said tongue free end, said tongues each including a portion that protrudes into said inner space when said bushing both is and is not being inserted, and said portion being thicker than said nominal wall thickness, said tongues each further including a tapered surface that faces said leading end of said body and tapers toward the center of said inner space with greater distance from said leading end, wherein said tongues are configured so that, when said bushing is inserted, said wire bears against said tongues, both of said tongues are forced against the inner wall of said metal sheath, one of said tongues seats in said groove, and said ridge engages a cut edge of the cut end of said sheath, preventing said cut edge from rotating into said lengthwise opening.

16. An anti-short bushing to be inserted between a metal sheath and an enclosed wire of a flexible armored cable of the kind whose sheath has a groove on its interior surface, said bushing comprising a generally tubular insulating body including a flange at one end, and a retainer attached to and movable relative to said body, said retainer having a free end angled to conform to the angle of said groove and a ridge connected between said flange and said tubular body and configured to engage a cut edge of the cut end of the sheath.

17. The bushing of claim 16 wherein said retainer comprises a tongue having a fixed end attached to said body.

18. The bushing of claim 17 wherein said tongue is elongated, said body has a leading end which is to be inserted first into said sheath, and said fixed end of said tongue is nearer said leading end than is said free end.

19. The bushing of claim 18 wherein said retainer comprises two said tongues.

20. The bushing of claim 19 wherein said free ends of said two tongues of said two retainers respectively are positioned at two different distances from an end of said body.

21. The bushing of claim 19 wherein said insulating body encloses an inner space and each said tongue includes a tapered surface that increases toward the center of said inner space with greater distance from said leading end, so that as said wire enters said leading end, said wire bears against said tongue, forcing it partially outside said body.

* * * * *